UNITED STATES PATENT OFFICE 2,162,172

CONDENSATION PRODUCTS OF THE PHENOL-FORMALDEHYDE TYPE

Herbert Hönel, Vienna, and Alois Zinke, Graz, Austria, assignors to Helmuth Reichhold, Detroit, Mich., doing business as Reichhold Chemicals No Drawing. Application November 18, 1936, Serial No. 111,490. In Germany November 21, 1935

3 Claims. (Cl. 260—51)

The invention relates to high-grade condensation products of the phenol-formaldehyde type.

According to our new process there may be produced valuable bases for the manufacture of varnishes and also products which may be employed for various other purposes, for example for the manufacture of plastic masses or shaped bodies and the like.

The present invention is a continuation in part of our application Serial No. 30,152, filed July 6, 1935.

In our application Serial No. 30,152 the production of resinous condensation products is described, phenols, terpenes and compounds closely related therewith and aldehydes being used as starting materials. First there are produced more or less high molecular phenolic bodies by condensing terpenes and the like with phenols with the aid of suitable catalysts or using separately formed derivatives as intermediates according to various methods, preferably however by forming terpene halides and then condensing the same with phenols with the aid of metal halides. These phenolic bodies having substituents of terpene-like nature are then subjected to condensation with compounds containing a carbonyl group, preferably after having been suitably purified. Products of the most various properties are obtained by these condensation reactions according to the conditions of the reactions and to the proportions of the components.

Now we have found that instead of and in addition to terpenes, terpenogenes, corresponding oxygen-containing compounds, acyclic compounds genetically related to the terpenes, etc. such as are particularly mentioned in our application Serial No. 30,152 there may be used as starting materials quite generally alicyclic compounds having side chains or joined on non-aromatic rings or technical mixtures containing at least a considerable proportion of such compounds. From phenols and these starting materials preferably by means of their halogen compounds equally valuable more or less high molecular phenolic bodies are obtained having properties similar to those of the phenolic bodies obtained from the terpene like substances. The structure of the phenolic body first formed is thus characterised in that alicyclic compounds carry side chains or joined on non-aromatic rings on the one hand and at least one aromatic substituent having at least one phenolic hydroxyl group on the other hand. If the alicyclic compound carries a plurality of such aromatic substituents these are linked with different C-atoms of the alicyclic compound.

The alicyclic compounds or technical mixtures containing the same may be of saturated or unsaturated nature. They may be oxygen-free or oxygen-containing i. e. they may be both hydrocarbons and e. g. alcohols and the like.

The formation of the halogen compounds of these starting materials of course must be in agreement with the nature of these starting materials. If essentially saturated compounds (hydrocarbons) are used, such as hexahydrotoluene, hexahydroxylene, dekahydronaphthalene, or generally speaking homologues of the cyclohexane or other poly-methylene compounds i. e. cyclo-paraffines (cyclopentane, -heptane etc.), substitution of halogen is necessary. Very cheap technical mixtures of substances being rich in such saturated compounds are e. g. mineral oils, rich in naphthenes, of Caucasian, Rumanian and partly also Galician, Californian and Canadian origin, more particularly the middle or heavy benzines obtained from the mineral oils. Also brown coal tars and mineral coal tars and their distillation products respectively contain such acyclic compounds. Other examples for suitable saturated compounds are: methylcyclobutane, di- and tri-methylcyclohexanes contained in petroleum fractions, di-methylethylcyclohexanes, methylcyclopentane, dicyclopentyl and derivatives isolated e. g. by Jennings, La., dicycloheptyl, dekanaphthenes or also oxygen containing compounds such as methylcyclopentanol, -hexanol, naphthenic alcohols obtained from naphthenic acids by reduction, dekahydronaphthol, etc.

If hydrocarbons having unsaturated non-aromatic linkages are contained in the starting materials addition of halogen or hydrogen halide may be employed instead of substitution. Examples of such unsaturated compounds are: methylcyclopentene, methylenecyclopentane, ethylidencyclopentane, dicyclopentadiene, tetrahydrotoluene, methylenecycloheptane, methylcycloheptene, hexa- and octohydronaphthalene, etc. Some relatively low molecular mixtures of substances which may be obtained from high molecular substances partly systematically (e. g. gasolines produced by cracking), partly as otherwise almost valueless by-products (e. g. coal oils) form particularly cheap starting materials having a large content of such unsaturated hydrocarbons.

In addition to employing halogen compounds as intermediates these starting materials may also be condensed with phenols according to various other methods and using various other catalysts. E. g. the Königs synthesis may be employed according to which sulphuric acid-glacial acetic acid are used as reaction agent, or also the Schrauth synthesis, which employs hydrochloric acid-glacial acetic acid. On occasion it is also possible to effect mutual reaction with the aid of hydrochloric acid alone whereby the phenol is substituted. More or less suitable catalysts are further: strong mineral acids, organic sulphonic acids; furthermore halides of certain metals and metalloids e. g. aluminium chloride, ferric chloride, boron fluoride, and in certain cases also silicated earths. The condensation is however most suitably effected in the presence of metal halides using hydrogen halide addition products as intermediates.

Starting materials having alcoholic groups may either be first treated with hydrogen halide in order to obtain by esterification the corresponding halogen compounds, which are then condensed with phenols in the way described hereinbefore; or they may also be reacted as such with phenols by means of dehydrating agents with the formation of (substituted) relatively high molecular phenolic bodies.

The formation of the relatively high molecular phenolic bodies with the use of halides of the alicyclic substances as intermediates is, as a rule, to be preferred 1, since this method may be generally employed, irrespective whether there are unsaturated or alcoholic groups present; 2, since almost without exception C—C linkages are formed when condensing with phenols, i. e. substitution of nuclear hydrogen atoms of the phenol takes place, but no substitution of the hydrogen atom of the phenolic hydroxyl group with the formation of etherlike compounds; also the formation of disturbing by-products may be avoided in all cases. Moreover it is possible to form intermediates relatively rich in halogen by substitution, which when condensed with phenols yield high molecular bodies carrying a correspondingly large amount of phenolic rings.

One often succeeds in limiting the substitution by halogen to tertiarily bound hydrogen atoms which are present in the alicyclic compounds at the places where the side-chains branch off. The corresponding tertiary halides not only particularly readily react with phenols but also the substitution of the phenols as a rule takes place in p-position to the phenolic hydroxyl group, particularly when employing low reaction temperatures. P-substituted phenolic bodies and the condensation products obtained therefrom with formaldehyde and the like respectively are distinguished by the fact that they do not show yellowing phenomena. In order to be able selectively to effect the substitution of hydrogen atoms of the alicyclic starting materials or generally in order to secure an as far as possible uniform halogenation it is suitable to work e. g. when chlorina'ing at low temperatures with strong dilution and exposure to actinic light rays.

Among alcoholic starting materials in an analogous way tertiary alcohols are to be preferred, among unsaturated starting materials those which contain

groups wherein olefinic linkages are present at one or several branching places. (In the case of intermediary addition of hydrogen halide, sulphuric acid, etc. there are also formed tertiary compounds.)

Moreover we should like to mention that in order to obtain suitable halogen compounds in accordance with the nature of the starting material several different methods may be employed simultaneously or subsequently, e. g. addition (of halogen or hydrogen halide) and substitution or esterification (hydrogen by halogen or hydroxyl by halogen) the latter by means of hydrogen halide. Depending on the choice of the reaction conditions the most various phenolic bodies and mixtures thereof respectively may be produced. They are of oily or soft nature if non-unitary mixtures of substances are used as starting materials which predominantly contain monovalent halides or form the same intermediary in the reaction mixture. If unitary, more particularly tertiary monohalides have been employed, suitably obtained in the manner described hereinbefore, crystalline well defined phenolic bodies may be produced. If essentially polyvalent halides or compounds forming the same are employed, as a rule, more or less solid, tack-free, resinous masses are obtained. When starting from these substances it is often possible also to convert reaction masses which are first oily or soft resinous (viscous) into solid resinous phenolic bodies by prolonged heating in the presence of a catalyst and the hydrogen halide set free during the reaction. An increase of the molecular weight takes place during the heating which is probably due to polymerisation caused by unsaturated linkages still present or formed.

To condense the herein phenolic bodies with formaldehyde, similar principals apply to those set forth in our application Ser. No. 30,152. When condensing highly viscous or solid resinous phenolic bodies the co-employment of indifferent solvents of the phenolic body is advisable, e. g. of benzene hydrocarbons, alcohol or the co-employment of low molecular phenols. The use of such auxiliary materials is particularly advisable in the case of a preferred mode of effecting the condensation of the high molecular phenolic body with formaldehyde, which consists in that the two substances are caused to act on each other in the presence of strong alkalies at ordinary or only slightly increased temperature for a prolonged period in a given case for several days. In most cases only this method permits of compounding excess of formaldehyde (calculated on bound phenol) and in this way leads to distinctly hardenable condensation products. Particularly when it is intended later on to employ the condensation products in the varnish manufacture the alkali is precautiously eliminated.

As to the uses of the products obtainer according to the various condensation methods herein described, attention is called to the disclosure of our application Ser. No. 30,152. Also the new products described herein constitute valuable basic materials for the varnish manufacture as well as for the production of plastic masses and of molded articles respectively if desired with the addition of various filling materials.

*Example 1*

Dry chlorine is passed into 50 grms. of benzine having a boiling range of 96 to 104° C. and obtained from Rumanian petroleum, under cooling with water and exposure to actinic light rays, until the amount of chlorine absorbed amounts to 19 grms.

The resulting chlorinated product is condensed at 50° C. with 50 grms. of phenol with the addition of 1 grm. of anhydrous zinc chloride. After heating for 24 hours the reaction product is treated with steam and the excess phenol removed in this manner. The gross yield of condensation product amounts to 50 grms. The product consists for the greater part of p-tert.-methyl-cyclohexyl-phenol which may be obtained pure by vacuum distillation and re-crystallisation from ligroin.

Both the entire condensation product and also in particular the purified product yield on condensation with formaldehyde very valuable non-yellowing resins readily soluble in oils. A hardenable oil-soluble resin may for example be obtained by condensing 1 part of the crystalline product with 0.8 part of aqueous formaldehyde (40% vol.) with aid of soda lye or the like. After acidifying there is obtained at ordinary temperature an oily condensation product which is viscous at higher temperatures and which on further heating becomes solid and resinous. The resulting products are for example also readily soluble in benzine and the like. Instead of the benzine mentioned which contains a considerable portion of methylcyclohexane, there may also be employed as starting material the pure hydrocarbon obtained by hydrogenation of toluene.

Example 2

100 grms. of benzine rich in naphthenes with a boiling range of 68–88° C. are subjected under cooling with water and exposure to actinic light rays to the action of dry chlorine until an increase in weight of 43 grms. has taken place. The resulting halide is then condensed at 60 to 70° C. with 85 grms. of phenol and 5 grms. of anhydrous zinc chloride. After heating for 24 hours the reaction product is treated with steam and the excess phenol is removed.

The crude product is a dark viscous substance which on being condensed with formaldehyde with the aid of catalysts, constitutes valuable high molecular oil-soluble resins.

Example 3

A mixture of xylenols catalytically hydrogenated by means of hydrogen (1 part) is brominated with elementary bromine (3 parts). The reaction is promoted by exposure to actinic light rays and by heating above 100° C.

The reaction product is gradually introduced into 3 parts of molten phenol wherein 0.1 part of anhydrous zinc chloride and a small portion of anhydrous ferric chloride are dissolved. After the condensation reaction is terminated at 40° C. the catalysts are rendered inactive by addition of water and the excess of phenol employed is removed in a suitable way. The residue (2½ parts) constitutes a thickly liquid, light brown mass which can not be distilled without decomposition.

When condensed with 0.5 to 0.7 part formaldehyde (40% vol.) at boiling temperature with the aid of strong mineral acids as catalyst a hard resin light brown in color and readily soluble in oils is obtained. The condensation is advantageously carried out in the presence of an indifferent solvent, for example toluene.

Example 4

The entire mixture of the phenolic bodies obtained according to Example 3 is condensed with 3 parts of formaldehyde (40% vol.) during 14 days in the presence of 0.2 part of sodium hydroxide which cause a clear solution. The alkali is thereafter precautiously removed, e. g. by acidifying. The thickly liquid condensation product which is rather light in color, may be converted by precautiously heating into a solid, tough resin which is soluble not only in alcohols but also in benzene hydrocarbons. By heating under pressure at temperatures above 130° C. an unmeltable insoluble turnable mass is obtained in a short time which is distinguished by good light fastness, very great resistance against chemical influences, e. g. alkalies. A further advantage consists in that the condensation product is compatible with considerably larger proportions of a plasticizer such as castor oil, phthalic acid esters etc. than is the case with hardenable condensation products of the phenol or m-cresol, without the formation of turbidity (clouds) or exuding during hardening.

Example 5

The phenol used according to Example 3 as starting material is substituted by o-cresol. The condensation which takes place considerably more slowly, is promoted by heating to 80° C. The catalysts are finally destroyed and eliminated by washing together with the hydrogen bromine present in the reaction mixture.

The reaction product which has been purified in this way is condensed together with the excess of o-cresol employed and contained therein with 3 parts of formaldehyde at 50° C. in the manner described in Example 4.

The thickly liquid condensation product obtained after suitable purification as well as that converted into the solid state by short heating above 100° C. are of hardenable character and may be combined in any proportion with drying oils and other varnish basic materials (irrespective of their degree of acidity) to homogeneous masses.

Example 6

50 grms. of 1-methyl-1-cyclopentanol are shaken with three times the quantity of concentrated hydrogen chloride with initial cooling for about 1 hour. The tertiary methyl-cyclopentyl-chloride which has been obtained almost quantitatively is separated from the watery layer and condensed with 43 grms. of phenol in the presence of 2 grms. of aluminium chloride and an indifferent solvent at room temperature for 24 hours. After washing with water and distillation of the solvent 82 grms. of a pale yellow raw product are obtained which solidifies in a crystalline state and constitutes almost pure p-tertiary methyl-cyclopentyl-phenol.

When condensing the product with formaldehyde almost colorless lightproof and readily oil-soluble resins are obtained. A resin having distinct hardenable properties is e. g. obtained, if the product is condensed with an equal amount of formaldehyde (40% vol.) with the aid of an amount of caustic lye sufficient for the formation of a clear solution for 24 hours at 60° C. suitably in the presence of a reducing agent e. g. an oxalate. The condensation product which is liquid above 60° C. is precautiously freed from alkali by washing with weak acids and finally dried.

If the condensation is carried out at temperatures below 50° C. oily to viscous condensation products are obtained which may be converted into solid resins by subsequent heating.

A phenolic body of lower uniformity and purity is obtained also in a lower yield if phenol is heated to about 110° C. immediately with the said alcohol in the presence of dehydrating agents e. g. zinc chloride, the reaction water being simultaneously distilled off.

Example 7

100 parts of decahydronaphthalene (decalene) thinned with 3 to 4 times the quantity of carbon tetrachloride, are chlorinated until the increase in weight amounts to 50%. The mixture of the chlorides is gradually introduced with stirring into 100 parts of phenol at 50–60° C. in the presence of 5 parts of zinc chloride. The condensation product which has been obtained with splitting off of hydrogen chloride and which first is thickly liquid is converted by heating for several hours at 100° C. and by further splitting off of hydrogen chloride into a resinous product which is solid at ordinary temperature.

After adding a water-insoluble thinning agent and removing the small portion of phenol which has not entered into reaction by washing or the like, the condensation is effected with 60 parts of formaldehyde (40% vol.) in the presence of 5 parts of concentrated hydrogen chloride with continuous stirring at boiling temperature. After removing the water, washing and distilling off the thinning agent 165 parts of a pale-brown, very hard and high melting, readily oil-soluble resin are obtained.

Example 8

100 grms. of the fraction of a mixture of substances boiling between 75 and 160° C. obtained from gas oil by thermic destruction in the vapor phase in an iron tube at 600° C., and 50 grms. of a xylenol mixture boiling between 207 and 217° C. are mixed and 3 grms. of aluminium chloride are gradually added. After the initially strong self-heating has abated the reaction mixture is heated for about 60 hours at 60° C. Thereafter it is washed with water and the portions of the mixture of substances employed which have not taken part in the reaction are distilled off.

In this way 65 grms. of a mixture substantially consisting of benzene and homologues and about 83 grms. of a residue of phenolic nature partially consisting of slowly reacting xylenols are obtained. According to statements in the literature apart from aromatic hydrocarbons olefines, diolefines and a considerable portion of cyclic unsaturated hydrocarbons having side chains are probably present in the initially applied mixture of substances obtained from gas oil.

The phenolic residue above obtained is condensed with 25 grms. of formaldehyde (40% vol.) or 17 grms. of acetaldehyde in presence of 4 grms. of concentrated hydrochloric acid or other strong mineral acid. Very hard and high melting, readily oil-soluble resins are obtained. Oil varnishes prepared therefrom show a high resistance against alkalies.

What we claim is:

1. A non-yellowing condensation product obtained from formaldehyde and 1-alkyl-1-p-hydroxy-phenyl-cycloparaffine.
2. A non-yellowing condensation product obtained from formaldehyde and 1-methyl-1-p-hydroxy-phenyl cyclopentane.
3. A non-yellowing condensation product obtained from formaldehyde and 1-methyl-1-p-hydroxyphenyl-cyclohexane.

HERBERT HÖNEL.
ALOIS ZINKE.